United States Patent [19]
Giordano et al.

[11] Patent Number: 5,850,078
[45] Date of Patent: Dec. 15, 1998

[54] SIMPLIFIED ASSEMBLY AND AUTOMATIC TESTING OF COMPONENTS IN ELECTRO-OPTICAL SYSTEMS FOR READING CODED INDICIA

[75] Inventors: Joseph Giordano, Bayville; Jean Tu, Stony Brook; Yuri Gofman, Bohemia; Daniela Stratienco, Sound Beach; Timothy Kehoe, Smithtown; Paul Severino, Islip; Howard Shepard, Great River; Edward Barkan, Miller Place; David Harder, East Islip; Joel Kahn, Rockville Centre; Robert Sanders, East Islip; John Barile, Holbrook; Chang-Hong Chen, Stony Brook; Steven Chew, East Northport; Robert Doran, East Setauket; Robert Grabowski, Centerport, all of N.Y.

[73] Assignee: Symbol Technologies, Inc., Holtsville, N.Y.

[21] Appl. No.: 585,788

[22] Filed: Jan. 16, 1996

[51] Int. Cl.$^6$ ........................................................ G06K 7/10
[52] U.S. Cl. ................................................ 235/462; 235/472
[58] Field of Search ........................................ 235/462, 472

[56] References Cited

U.S. PATENT DOCUMENTS

| | | | |
|---|---|---|---|
| 2,442,913 | 6/1948 | Abrams . | |
| 3,902,952 | 9/1975 | Penaluna | 156/384 |
| 4,355,861 | 10/1982 | Sebald | 350/61 |
| 4,548,132 | 10/1985 | Moon | 100/52 |
| 4,710,045 | 12/1987 | Lim | 400/352 |
| 4,825,057 | 4/1989 | Swartz et al. | 235/472 |
| 5,200,597 | 4/1993 | Eastman et al. | 235/472 |
| 5,212,371 | 5/1993 | Boles et al. | 235/472 |
| 5,260,554 | 11/1993 | Grodevant | 235/462 |
| 5,264,956 | 11/1993 | Tzu-Chin | 235/462 |
| 5,288,984 | 2/1994 | Ito et al. | 235/472 |
| 5,304,788 | 4/1994 | Metlitsky et al. | 235/467 |
| 5,432,609 | 7/1995 | Girodano et al. | 235/472 |
| 5,471,036 | 11/1995 | Sperbeck | 219/522 |
| 5,475,206 | 12/1995 | Reddersen et al. | 235/462 |
| 5,552,592 | 9/1996 | Dvorkis et al. | 235/472 |
| 5,583,332 | 12/1996 | Krichever et al. | 235/462 |
| 5,626,980 | 5/1997 | Ruth et al. | 429/100 |

FOREIGN PATENT DOCUMENTS

| | | |
|---|---|---|
| 58-90196 | 5/1983 | Japan . |
| 1-40923 | 8/1987 | Japan . |
| 3-12582 | 1/1991 | Japan . |
| 1527-621 | 10/1978 | United Kingdom . |

*Primary Examiner*—Donald T. Hajec
*Assistant Examiner*—Douglas X. Rodriguez
*Attorney, Agent, or Firm*—Kirschstein, et al.

[57] ABSTRACT

Various optical components of an electro-optical system for reading coded indicia are mounted on a chassis snap-mounted in a housing. The optical components are supported by the chassis at an elevation relative to a printed circuit board snap-mounted to the chassis. The optical components are automatically adjusted in a test fixture.

31 Claims, 6 Drawing Sheets

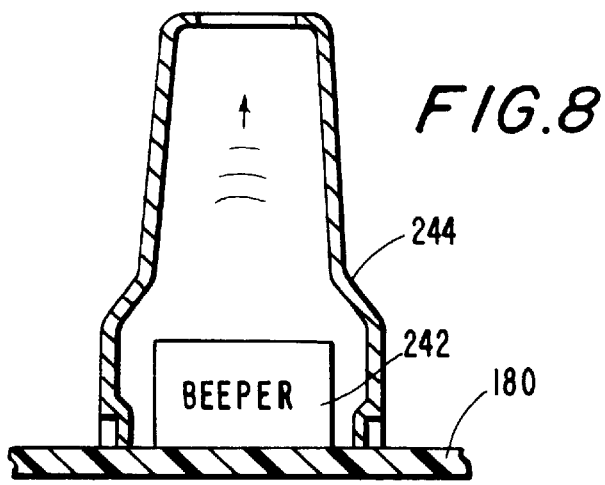
FIG. 8
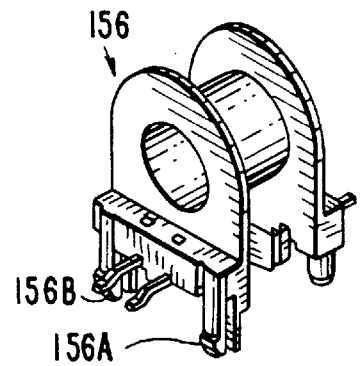
FIG. 10
FIG. 9
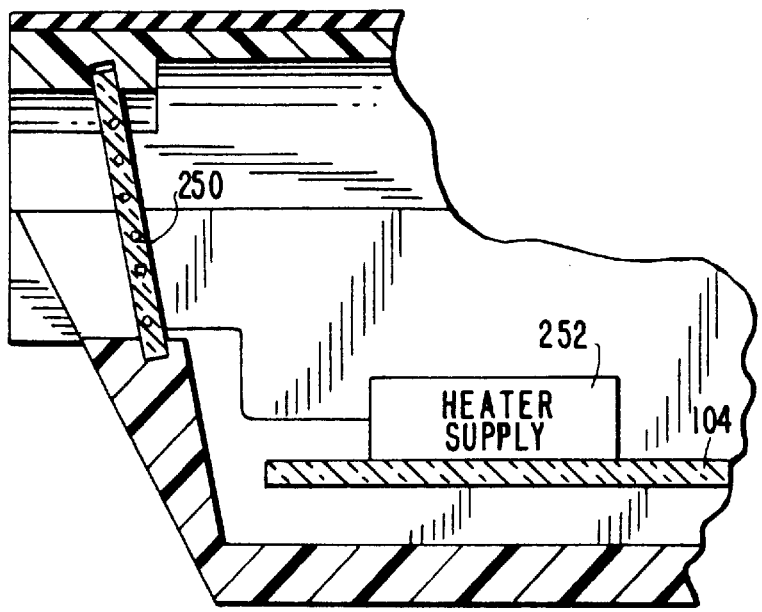

SIMPLIFIED ASSEMBLY AND AUTOMATIC TESTING OF COMPONENTS IN ELECTRO-OPTICAL SYSTEMS FOR READING CODED INDICIA

BACKGROUND OF THE INVENTION

1. Field of the Invention

This invention generally relates to electro-optical systems for reading indicia such as coded symbols and, more particularly, to simplifying the assembly and automatically testing the components in such systems.

2. Description of the Related Art

Electro-optical systems for reading coded indicia such as bar code symbols are well established in the art. See, for example, U.S. Pat. Nos. 4,251,798; 4,387,297; and 4,409,470, as well as the many other U.S. patents issued to Symbol Technologies, Inc., the assignee of the instant application.

Thus, a typical system includes a light source, such as a laser diode, for emitting a light beam toward a symbol for reflection therefrom. The reflected light is detected by a light sensor, such as a photodiode, over a field of view. The light beam and/or the field of view is scanned by an oscillating scan drive, typically including a light reflector. The sensor generates an electrical signal indicative of the symbol being scanned. This electrical signal is thereupon processed in a well known manner, typically to identify the item bearing the symbol, and then using this identification for inventory or check-out purposes. These electrical and optical components are often mounted in a hand-held, portable head or housing.

The assembly of the various system components is labor intensive. Various components, for example, the photodiode, are soldered to a printed circuit board on which electrical circuitry, for example, the signal processing, control and drive circuitry are mounted. Typically, a flexible strip cable is soldered to the laser diode and the circuit board. Also, an electromagnetic interference (EMI) shield is soldered to the circuit board. Many screws are used to secure various system components in place within the housing, and even the housing itself is composed of parts that are fastened together with screws.

Aside from the labor-intensive nature of assembling the components by soldering and by manually turning multiple screws, there is also the labor-intensive procedure of manually adjusting certain optical components. Optical adjustment among the light source, light sensor, light reflector, and scan drive is critical for proper system operation. At present, three adjustments are required to manually set the "alignment" of the optical sub-system. First, the power level of the laser diode is adjusted manually by the operator by holding a power meter in front of the laser beam and simultaneously manually adjusting a potentiometer on the circuit board. Second, the position or height of the laser beam is set by adjusting the position of a laser spot from the laser beam to the center of a scan mirror on the light reflector. This is accomplished by the operator manually turning an adjustment screw while watching the location of the laser spot on a video monitor that shows a zoomed-in picture of the reflector. Third, the sweep or amplitude of the scan drive is set by lowering a mirror in the path of the laser beam so as to reflect the laser beam onto a movable plate. On the plate are etched-in tolerances for the scan width (representing the amplitude). The operator manually adjusts a potentiometer on the circuit board until the scan width falls into predetermined specifications.

After these initial adjustments are performed in a test fixture, they must be manually verified after the optical sub-assembly is mounted in the housing in which they are to finally reside. These final adjustments are not guaranteed to take place (unit could be assembled without full alignment taking place) or not be fully within specifications. Sometimes, re-work is necessary to correct the alignment, thereby leading to increased manufacturing cost and complexity.

SUMMARY OF THE INVENTION

OBJECTS OF THE INVENTION

It is a general object of this invention to simplify the mounting of components in electro-optical systems for reading coded indicia.

It is another object of this invention to automate the adjustment of the optical sub-assembly in such systems by reducing human involvement.

It is still another object of this invention to reduce overall manufacturing cost and complexity in such systems.

FEATURES OF THE INVENTION

In keeping with these objects and others which will become apparent hereinafter, one feature of this invention resides in supportably mounting a light source component for emitting a light beam, a light sensor component for detecting light from indicia over a field of view, and a light reflector component used for scanning at least one of the light beam and the field of view, on a chassis that, in turn, is snap-mounted in a housing. The chassis is used with an automated test fixture for automatically adjusting the laser power level, the laser beam height and the amplitude of the scan drive, thereby effectively reducing, if not eliminating, all operator judgment in aligning the optical sub-assembly and guaranteeing that all necessary adjustments will be made during manufacture and assembly. The automated fixture provides a higher level of accuracy and repeatability, and the need to re-work or verify the alignment in the housing should all but be eliminated.

In the preferred embodiment, the housing includes a cover that overlies, and is snap-mounted to, a housing shell in an assembled condition of use. A printed circuit board is mounted in the housing, preferably by being snap-mounted on the chassis. The cover has formations that clamp the circuit board to the chassis in the assembled condition of use. Also, the cover has additional formations for securing the position of an optical block or casing in which the light source component is mounted.

Other features of the invention include heating a light-transmissive window through which the light beam and the reflected light pass in opposite directions to prevent fogging, providing EMI protection for the light sensor component as well as good heat dissipation for the light source component, detachably mounting a boot or cap on the end of a handle connected to the shell, providing a cable connected to the housing with strain relief, self-supporting the housing on a horizontal support surface, providing the cover with light-absorbing and shock-absorbing properties, optimizing communication between a user and the system by improved visual, audio and vibratory status indicators for indicating system operation, providing a novel dual-finger trigger, pivoting the trigger at a new location on the housing, and forming certain system components with features to allow easy assembly.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 8 is a sectional view of an acoustic resonator for use with the housing of FIG. 1;

FIG. 9 is a sectional view of a modified window construction for use with the housing of FIG. 1; and FIG. 10 is a perspective view of a component of the scan drive.

DETAILED DESCRIPTION OF THE PREFERRED EMBODIMENTS

Figure 1:
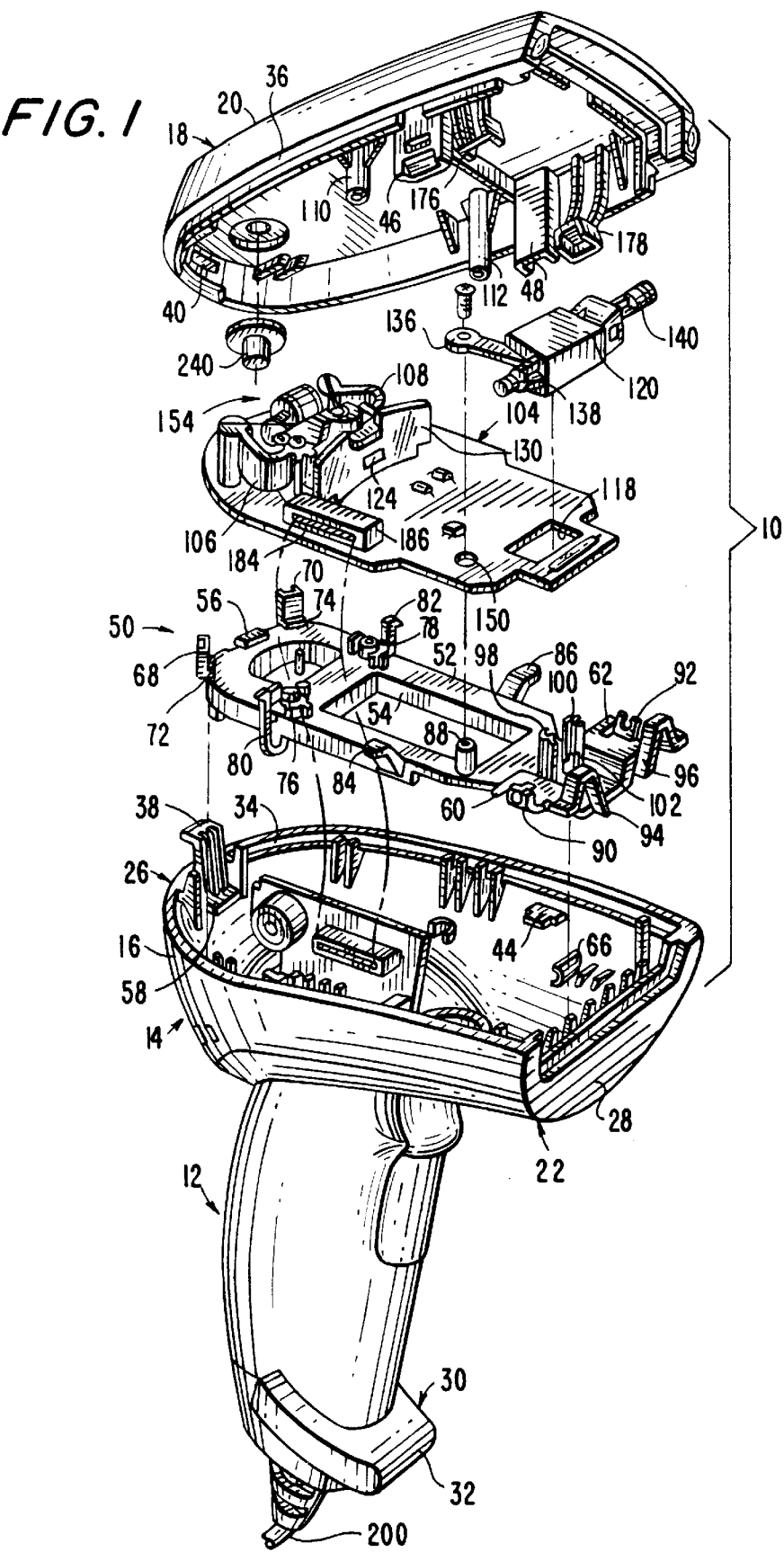
FIG. 1 is a perspective exploded view of a hand-held housing of a system for electro-optically reading coded indicia according to this invention.

Referring now to the drawings, reference numeral 10 in FIG. 1 generally identifies a lightweight, portable head or housing for use in a system for electro-optically reading coded symbols, such as one-dimensional or two-dimensional bar code symbols. Such symbols comprise a series of bars and spaces of varying widths arranged in a pattern which is decodable to a numerical representation characteristic of a product bearing the symbol.

The housing 10 is generally gun-shaped and has a handle 12 and a body or barrel 14. The handle has a cross-sectional dimension which can conveniently fit in the palm of a user's hand. The barrel 14 includes a lower barrel part or shell 16, which, in FIG. 1, is shown to be integral with the handle 12, as well as an upper barrel part or cover 18. The handle and shell are constituted by a synthetic plastic material, preferably injection-molded. The handle is hollow and has opposite open ends. The cover 18 includes an inner liner constituted of an injection-molded synthetic plastic material and preferably being colored black to minimize internal light reflections, and is overmolded with an exterior canopy 20 constituted of a shock-absorbing material, typically rubber.

Figure 3:
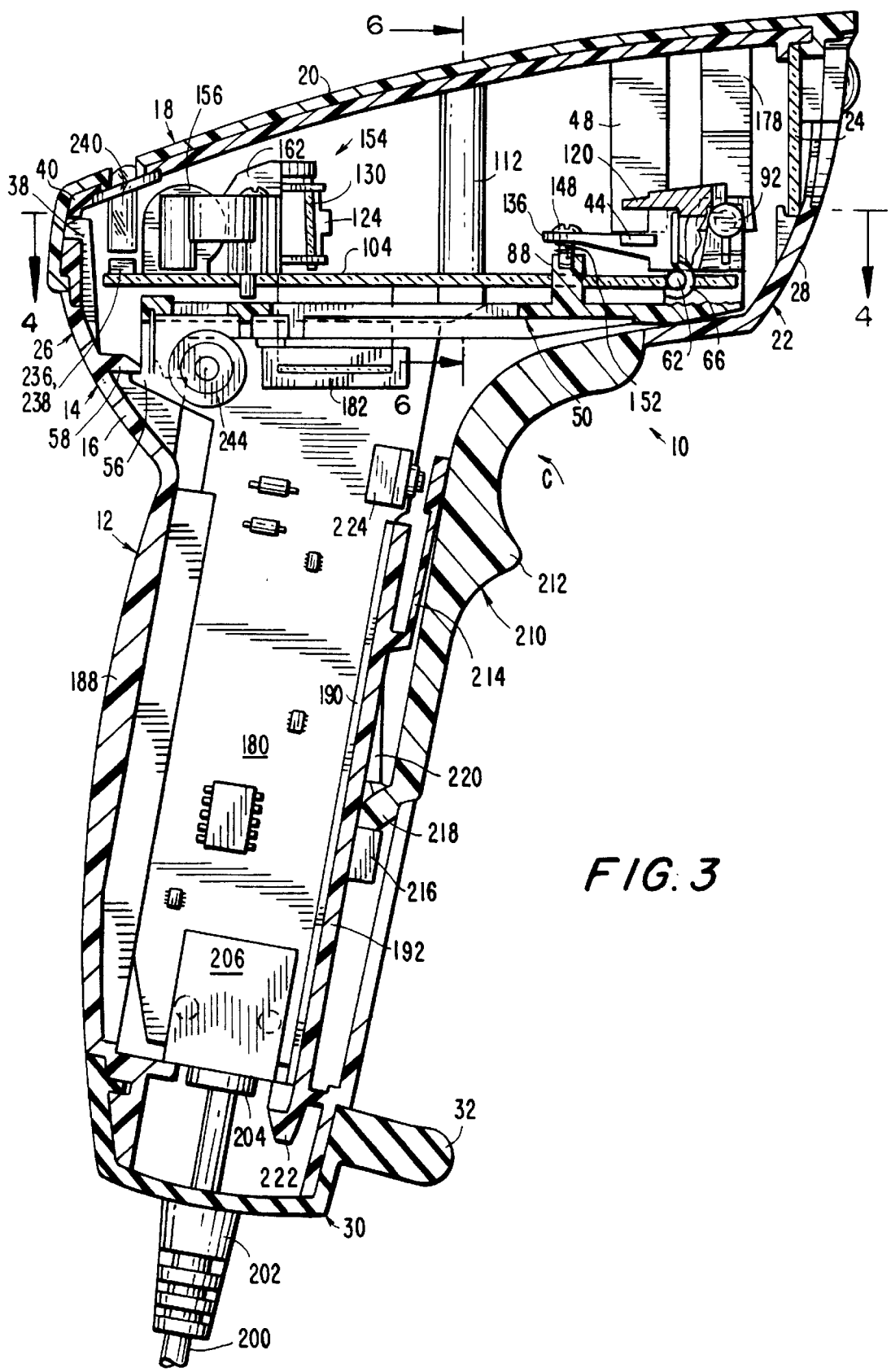
FIG. 3 is a sectional view taken on line 3—3 of FIG. 2.

The cover is, as shown in FIG. 3, assembled in a condition of use on the shell and bounds therewith an interior space for accommodating various system components, as described below. The barrel 14 has a front region 22 at which a light-transmissive window 24 is mounted between the shell and the cover, and extends generally along a barrel axis to a rear region 26. The handle is closer to the rear region and extends away from the barrel along a handle axis that forms an obtuse angle with the barrel. The front region 22 has an inclined front wall or front rest 28. A rubber boot or end cap 30 is mounted at the far end of the handle and has a forwardly-extending rear rest 32 which, together with the front rest 28, form a stable platform for supporting the housing on a generally horizontal support surface when the housing is not being held in one's hand.

The cover has a peripheral rim 36 which, as shown in FIG. 1, fits over a corresponding peripheral rim 34 of the shell. A rear, resilient upright latch 38 integral with the shell is inserted into a rear latching hole 40 extending through the liner of the cover prior to pivoting the cover closed onto the shell in a clamshell manner. A pair of tabs 42, 44 (see FIGS. 4 and 5) integral with the shell and spaced transversely apart are engaged with snap-action by a corresponding pair of latching arms 46, 48 integral with and extending downwardly of the cover in the assembled condition.

Figure 2:
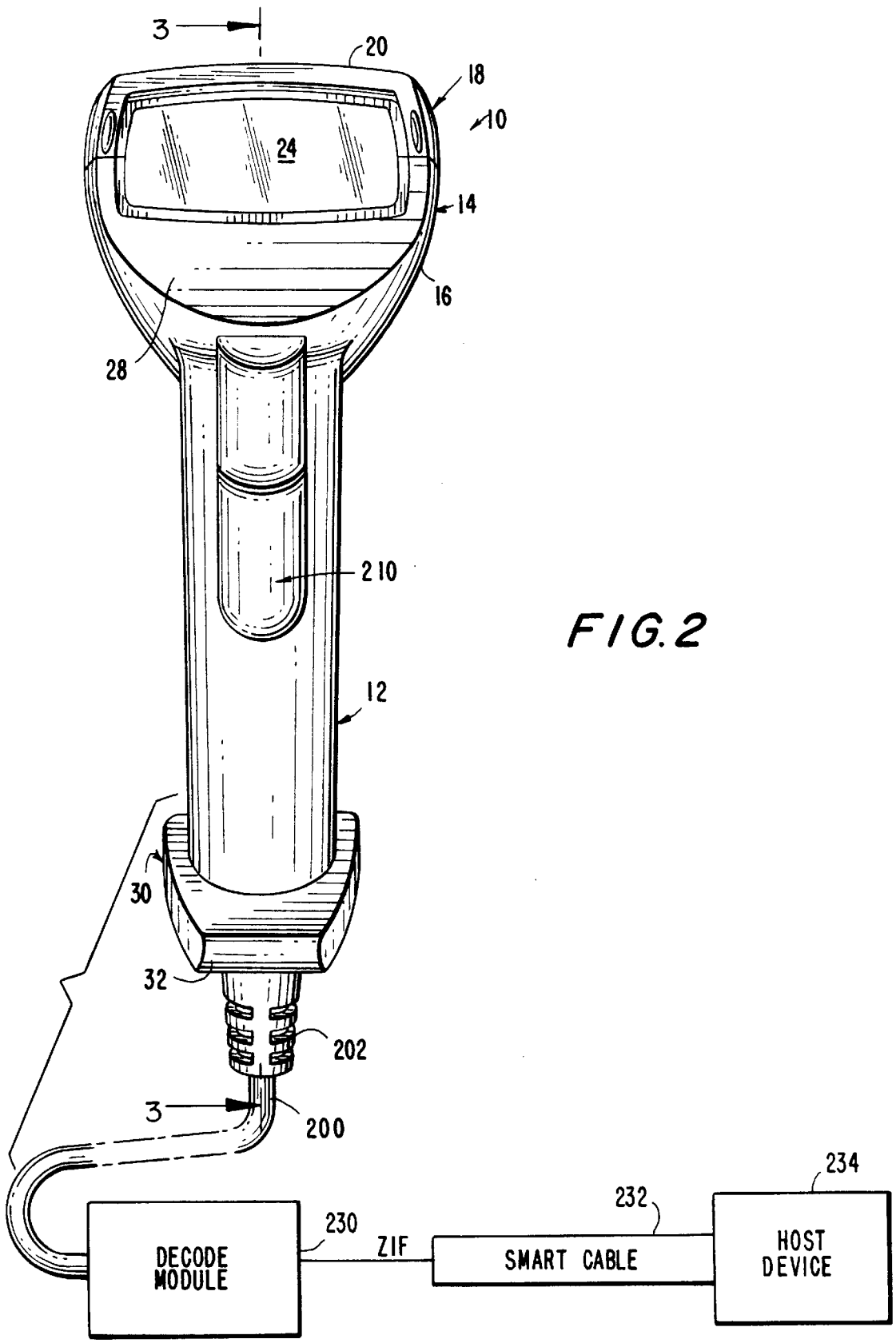
FIG. 2 is a front elevational view of the housing of FIG. 1 after assembly.

A chassis 50 is mounted between the shell and the cover at an inclined orientation relative to the horizontal (FIG. 2). As best shown in FIG. 1, the chassis is a one-piece molded synthetic plastic material part, preferably colored black to minimize internal light reflections within the housing. The chassis has a main rectangular body portion 52 formed with a rectangular cutout 54, a rear end having a resilient latch 56 that extends downwardly and engages a rear heel tab 58 integral with the shell with a snap action (see FIG. 3), and a front end having a pair of co-linear trunnions or stub shafts 60, 62 that are journaled in bearings 64, 66 integral with the shell. The bearings are rearwardly open so that the chassis is mounted on the shell by first forwardly inserting the stub shafts 60, 62 into the bearings 64, 66 and then, by pressing the rear end of the chassis downwardly until the latch 56 snappingly engages the rear heel tab 58.

As best seen in FIG. 1, the chassis 50 also has a pair of spaced-apart upright supports 68, 70 having ledges 72, 74 at the rear end; a pair of spaced-apart threaded cylindrical bosses 76, 78; a pair of spaced-apart cylindrical sleeves 77, 79; a pair of oppositely directed resilient latch elements 80, 82; a pair of side wings 84, 86 at opposite sides of the chassis; a single threaded post 88 at one side of the chassis; a pair of spaced-apart split catches 90, 92; a pair of spaced-apart front resilient arms 94, 96; a pair of channel-shaped holders 98, 100; and a support formation 102. The functions of these various parts are described below. As described so far, the chassis is securely snap-mounted in place onto the shell.

Figure 5:
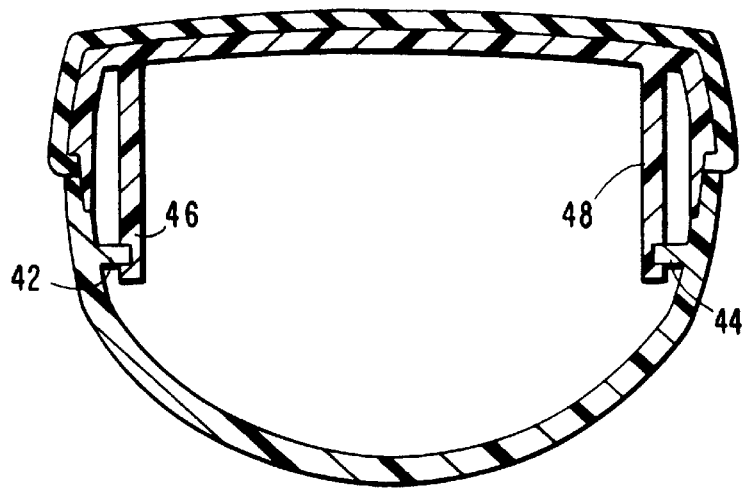
FIG. 5 is a sectional view taken on line 5—5 of FIG. 4.
Figure 6:
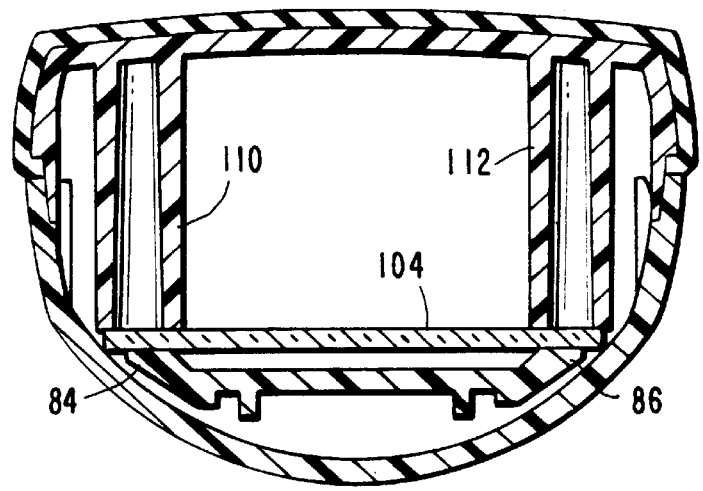
FIG. 6 is a sectional view taken on line 6—6 of FIG. 3.

A generally planar printed circuit board 104 is snap-mounted onto the chassis. The rear end of the board 104 rests on the ledges 72, 74 of the supports 68, 70. The latch elements 80, 82 extend through a pair of apertures 106, 108 formed through the board, and snappingly engage the edges of the board bounding the apertures. The board rests on the side wings 84, 86. As best seen in FIGS. 1 and 6, the cover has a pair of clamping posts 110, 112 that press the sides of the board 104 against the side wings 84, 86 and anchor the board in position. The front end of the board is clamped at its front edges between the resilient arms 94, 96. Electronic circuitry is mounted on the board, but has been substantially removed from the drawings so as not to unduly encumber them. For example, no circuitry is shown in FIGS. 5 and 6.

It is one feature of this invention to support various optical components directly on the chassis, and not on the board as was conventionally done in the prior art. Indeed, this invention mounts these components at an elevation above the board. This overhead or top-mounted configuration enables easy assembly and access to those optical components requiring adjustment, maintenance and/or replacement thereafter.

Figure 4:
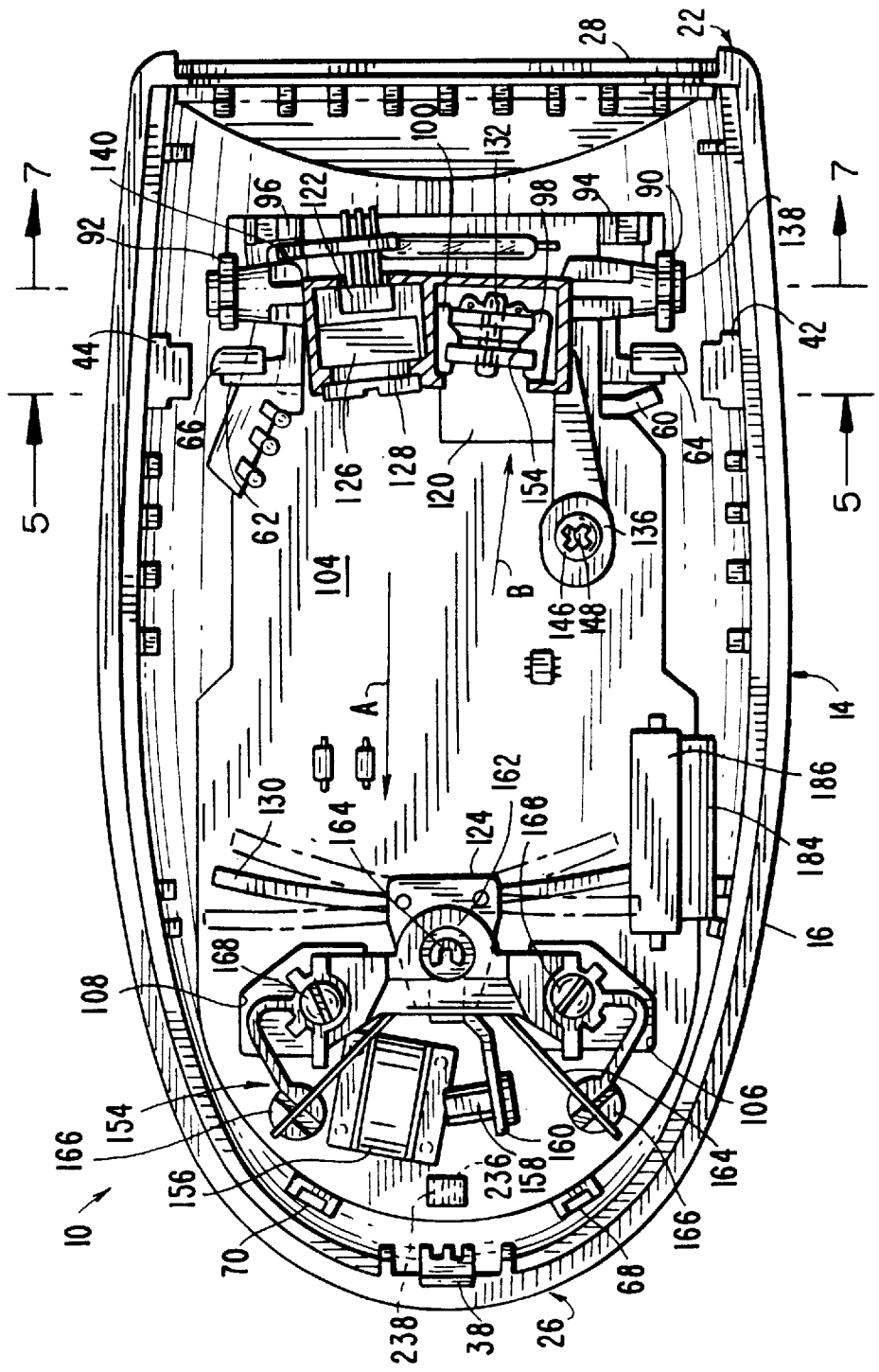
FIG. 4 is a top plan view taken on line 4—4 of FIG. 3 with the cover removed.

As best seen in FIG. 4, an optical block or casing 120 includes a first compartment for receiving a light source 122, e.g., a laser diode, for emitting a light beam at a rated power level in a rearward direction along the path indicated by arrow A toward a generally planar scan mirror 124 for reflection therefrom along an opposite forward direction through the window 24 outwardly of the housing. A focusing lens 126 and an aperture stop 128 together focus the emitted light beam to a scan spot having a given size in a range of working distances relative to a reference plane at which an indicium or symbol to be read is located. Light reflected from the indicium re-enters the housing through the window 24 and is collected by a generally concave spherical collection mirror 130, which is mounted for joint movement with the scan mirror 124, for reflecting the returned light along the path indicated by arrow B along the forward direction to a light detector, e.g., a photodiode 132 supported from behind by the support formation 102. An optical filter 134 is positioned between the channel-shaped holders 98, 100 in front of the detector to suppress and remove ambient light. The detector and the filter are mounted in a second compartment mounted side-by-side with the first compartment.

Figure 7:
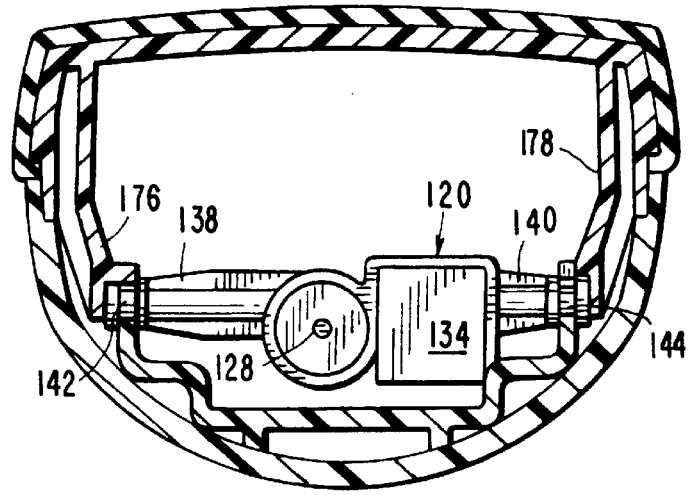
FIG. 7 is a sectional view taken on line 7—7 of FIG. 4.

The casing 120 has an offset positioning arm 136 and a pair of co-linear extensions 138, 140 extending in opposite directions away from each other. Each extension 138, 140 has a cylindrical shaft portion 142, 144 of reduced diameter (see FIG. 7) which is snap-fitted into the catches 90, 92 of the chassis. The casing is free to tilt and rotate slightly about the axis along which the extensions lie as the positioning arm 136 is adjusted. This is effected by providing an elongated slot 146 in the arm 136, and by tightening an adjustment screw 148 into the threaded post 88. As best shown in FIGS. 1 and 7, the cover also has a pair of downwardly-extending retainers 176, 178 which overlie and insure that the shaft portions 142,144 do not escape from their respective catches 90, 92 in the assembled condition of use.

As best seen in FIG. 1, the post 88 extends with mechanical clearance through a hole 150 in the board 104. A coil spring 152 surrounding the post 88 is captured under tension between the arm 136 and the chassis. Turning the screw 148 causes the height of the casing to be adjusted so that the emitted light beam can be aimed at a preselected spot on the scan mirror 124.

It will be noted that the casing 120 is mounted on the chassis at the catches 90, 92 and at the post 88. The laser diode and its associated optics are mounted within the casing 120 and, hence, are also supported on the chassis. The detector and its associated filter are mounted directly on the chassis by the elements 98, 100, 102 all of which extend with mechanical clearance through a front cutout 118 in the printed circuit board 104. Hence, none of these optical elements are mounted on the board itself.

The casing 120 is constituted of an all-metal, one-piece construction. This provides excellent heat dissipation for the laser diode, and excellent EMI protection for the detector, all without having to provide and/or mount separate heat sinks and shields.

A scan drive assembly 154 is used to oscillate the scan mirror 124 and the collecting mirror 130, together collectively referred to as the "light reflector". An electromagnetic coil 156 is mounted on the board 104. FIG. 10 depicts the coil in isolation, wherein the coil is advantageously provided with bent legs 156A, B to facilitate assembly. A permanent magnet 158 is mounted on a bracket 160 that is suspended from a rear part of a frame 162. The bracket 160 is supported by a thin, flexible strip of film 164, preferably Mylar™. Opposite ends of the film 164 are supported by rear mounts 166. The light reflector is mounted on the bracket 160. The bracket 160 is oscillatable in opposite circumferential directions about a drive shaft 164 also inclined perpendicular to the board 104. The frame 162 has bottom positioning pins for insertion into the sleeves 77, 79 of the chassis. As shown in FIG. 4, the bosses 76, 78 extend with mechanical clearance through holes 106, 108 in the board 104. A pair of screws 166, 168 is inserted through the frame 162 and threadedly engage the bosses 76, 78. Hence, the the frame is directly mounted on the chassis, and the light reflector is mounted on the frame.

In operation, the coil 156 is energized by an alternating excitation voltage which creates a magnetic field which cyclically attracts the permanent magnet 158 and draws it into the coil. This movement is translated by the bracket 160 to the light reflector.

As described so far, the optical components of the system, i.e., the light emitter 122, the light sensor 132, the focusing lens 126, the optical filter 132, and the light reflector 124, 130 are all supported at pre-selected locations on the chassis. These optical components are mountable and removable from above the board 104. These optical components are easily accessible and adjustable.

For example, as previously mentioned, turning the screw 148 causes the height of the casing 120 to be adjusted so that the emitted light beam can be aimed at a preselected spot on the scan mirror 124. This is performed in a test fixture by positioning two photodetectors (placed one on top of the other, divided by 0.060" black area) in the path of the laser beam. Using an algorithm based on feedback from the photodetectors, a tool will automatically turn the screw 148 to adjust the beam height until there is equal power detected on both photodetectors. This will then represent the position of the center of the scan mirror.

The power level of the laser source 122 is adjusted by positioning a power meter in the path of the laser beam and using an algorithm based on the feedback experienced, to step a digital potentiometer located on the circuit board 104 to reach the desired laser power setting. The electrical stepping of the digital potentiometer is done via test points on the bottom of the board 104.

The motor amplitude of the scan drive is set by scanning a predefined coded bar code symbol made of 10, 20 and 30 mil elements. Based on the feedback of the number of 20 mil elements scanned and the spot speed from this symbol, the motor amplitude can be set via a digital potentiometer through pogo pins making connection to the bottom of the circuit board 104.

The automated test fixture used to perform the adjustments detailed above will effectively eliminate all operator judgment in setting the optical alignment. It will also guarantee that all three adjustments are made during the manufacturing process. Due to the accuracy that will be attained and the improved level of process control, the need for re-work based on mis-alignment should all but be eliminated.

Another printed circuit board, namely, handle board 180, is inserted through the upper open end of the handle (prior to mounting of the board 104). The handle board includes electronic circuitry which has not been illustrated so as not to unduly encumber the drawings. As shown, however, in FIG. 3, the handle board has a handle connector 182, which is connected by a flexible ribbon cable 184 (see FIGS. 1 and 4) to a corresponding board connector 186 mounted on the upperside of the board 104. FIG. 3 shows the handle board 180 held in place by a first channel-shaped guide 188 integral with the handle 12 and by a second channel-shape guide 190 integral with a multi-function trigger plate 192, as described below.

An electrical cable 200 is connected to the lower end of the handle, and typically contains conductors that carry electrical power, control signals and data signals. The cable extends through a strain relief connector 202 to minimize overflexing of the conductors threat. The connector 202 is mounted at the bottom of the boot 30. The cable terminates in a plug 204 that mates with a corresponding socket 206 on the handle board 180.

An ergonometrically designed dual-finger trigger 210 is pivotably mounted at a lower region thereof on the housing. Trigger 210 has a ridge 212 for separating a user's forefinger from his or her other fingers. The trigger plate 192 has a resilient, integral spring arm 214 for exerting a constant outward biasing force on the trigger. The trigger plate has a lower abutment 216 for supporting a lower bulbous portion 218 of the trigger 210, and an upper abutment 220 for supporting the bulbous portion 218 from above. The bulbous portion is captured between the abutments 216, 220 and the handle, with freedom for the trigger to be depressed in the direction of the arrow C. The trigger plate has a lower end 222 that engages the handle with a snap-type action.

A trigger switch 224 is mounted on the handle board 180. When the trigger 210 is depressed, the switch 224 is also depressed, and an electrical trigger signal is generated by the switch closure, and is used to initiate reading of a symbol.

FIG. 2 schematically shows that the housing 10 is connected via the cable 200 to a decode module 230 and, in turn, through a zero insertion force (ZIF) and smart cable accessory 232 to a host device 234. As is known in this art, the sensor generates an electric signal which must then be decoded and processed. The host device is usually a cash register, computer or data base. Details of the operation of such devices can be had by reference to co-pending U.S. patent application Ser. No. 08/443,851 filed May 18, 1995, and also assigned to the assignee of the instant application.

Returning to FIG. 3, a pair of differently colored light emitting diodes 236, 238 on the board 104 serves as status indicators of system operation. When illuminated, the light from each diode is conducted through a lens or light pipe 240 to and through the liner and the canopy of the cover to visually advise the user of a certain system function. The pipe 240 enhances and optimizes the status lights.

Another type of status indicator is an annunciator or beeper and, as shown in FIGS. 3 and 8, a beeper 242 is mounted on the handle board 180 and, when activated, generates a sound indicative of system operation, for example, that a symbol has been successfully decoded. To optimize the transmission of sound from the beeper to outside the housing, an acoustic resonator 244 is mounted on the board 180 and contains the beeper therein. The resonator is designed to match the acoustical impedance frequency of the beeper, thereby maximizing sound output. Portals can also be strategically formed in the handle adjacent the beeper to magnify the sound output.

A successful decode can thus be indicated visually by a, for example, green light emitted by one of the diodes 236, 238; or by a sound by a beeper; or, in another embodiment, by a vibrator which generates vibrations and transmits the vibrations through the handle to the user's hand in a so-called "silent operating" mode.

FIG. 9 shows still another improvement relating to the window 24. When the housing is used in certain environments where the temperature and/or moisture levels vary, it sometimes happens that the window 24 fogs, thereby interfering with the light that passes in opposite directions through the window. To prevent such fogging, the window is heated, advantageously by attaching or embedding a resistive wire 250 to or in the window 24. A separate switch can be used to supply electrical current from a heater supply 252 to the wire as needed.

In accordance with this invention, rugged, "snap-able" assemblies have replaced screws where possible. The snap-on cover, snap-in casing, the snap-on printed circuit board (PCB), and the snap-in chassis, and the designing of the heat sink and electromagnetic interference (EMI) shield as an integral part of the casing 120, eliminated many screws and components from the prior art arrangements. The overall screw count went from ten to three (namely, screws 148, 166, 168).

To further facilitate the assembly, manual soldering was eliminated from the final assembly process. In prior art arrangements, soldering operations included: photodiode to PCB, visible laser diode (VLD) flexible cable to laser diode and PCB, and EMI shield to PCB. By way of a plug-in photodiode and sockets as part of the flex strip cable, soldering and its required skill and equipment are not needed.

Also eliminated was an extra holding component (and additional screw) for the photodiode and optical filter. This was done by holding these components through the PCB with the chassis. This also aids in ease of assembly.

Manual programming and placement of EEPROMS were replaced by "down-loadable" flash EEPROMS. Thus, the operation of an operator batch burning the PROM, handling the PROM to the correct station, and then PROM insertion, are all eliminated (flexibility and variety with insurance). This also allows for software upgrades and servicing without having to open the housing.

This invention achieves automation in the final assembly area. The prior art arrangement required three manual adjustments. The operator was relied on to manually set two potentiometers and to visually set a laser beam position.

The required adjustments could not be eliminated (the true goal), but by designing a digital potentiometers, minimal circuitry, and added test points, the adjustments are automatically done electronically. By designing the fixture in parallel with the housing, the necessary requirements are known. The operator loads the chassis, PCB and the components on the chassis as a unit on the fixture, and tells the computer what model is being built, and then presses "go". The adjustment settings are pre-set by model configuration, insuring that the required settings are correct.

Another aspect automated is the Final Acceptance Test (FAT). This test in the past was done by scanning a set of symbols and verifying good decodes based on a trigger pull (decode being a successful reading of the bar code symbol).

By designing this test in parallel with the instant invention, the test fixture will now communicate with the housing to insure the correct PCBs are included and the symbols will be controlled so that incorrect scans are eliminated. The unit software will be written to test the percent decode (actually monitor the number of successful decodes per 50–100 scans), and the fixture will accommodate tolerances that may be required for the pitch and roll of the unit. Various electronic lines will be tested as well, thus adding to the completeness of the test. Thus, the FAT becomes a Systems Acceptance Test (SAT). Parallel process design reduces numerous existing FAT set-ups to only one. Change-over time is virtually eliminated.

Throughout the entire assembly, data is collected through the automated fixture. All adjustment settings and levels are recorded as will any defects and rejects (with potential root cause analysis) to provide accurate design feedback. By designing in these concepts up-front, Statistical Process Control (SPC) is involved from the early stages to aid in operator training, real time process control and total product traceability through the final assembly process.

Assembly of the instant invention is acceptable with a cell or production line of three benches that will consist of two assemblystations operations, and a packaging station.

The stations themselves are balanced (cycle time per station). Capacity was increased by designing the manual assembly and automated portion of each station together in series. For increased capacity, all that is needed is more holding nests for the assembly process to reduce the gating process times. The assembly process is done in parallel with the automated process at a minimum cost (parts will actually be spare parts anyway) at higher capacity.

To accommodate bulky material handling, piece part packaging was developed up front and designed into the production line. This allows the operator to use the piece part packaging as the material bin, eliminating the need to empty one container into another. Designed into this part packaging was a lot (or pan) size that coincided with the production lot size. By packaging to a specific pan size, the need for in-house kitting is eliminated.

Overall, automation is introduced to the final assembly process and the labor is reduced by over 50% as the workstations are reduced from eight to three.

The ease of assembly results in increased quality of the product, which equates to customer satisfaction. Improved material handling reduces costs.

It will be understood that each of the elements described above, or two or more together, may also find a useful application in other types of constructions differing from the type described above.

While the present invention has been described and illustrated herein as embodied in a specific construction of a mounting assembly for use in bar code symbol readers, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims.

We claim:

1. A mounting arrangement in a system for electro-optically reading indicia, comprising:
   a) a housing;
   b) a chassis snap-mounted in the housing and having a body portion generally lying in a first plane;
   c) a circuit board supported by the chassis and generally lying in a second plane elevated above the first plane, said circuit board having holes extending therethrough;
   d) a light emitter for emitting a light beam;
   e) a light sensor for detecting light from the indicia over a field of view;
   f) a scanner including a light reflector for scanning at least one of said light beam and said field of view; and
   g) means extending through the holes for supporting the emitter, the sensor and the reflector on the chassis at accessible locations elevated above the first plane and the second plane.

2. The mounting arrangement of claim 1, wherein the housing has a support shell, a cover overlying the shell in an assembled condition of use, and a handle for holding the housing.

3. The mounting arrangement of claim 2, wherein the shell has an integral heel tab and a pair of integral bearings; and wherein the chassis includes a resilient latch for latchingly engaging the heel tab, and a pair of stub shafts journaled in the bearings.

4. The mounting arrangement of claim 2, wherein the shell has a rear support member and a pair of integral side tabs; and wherein the cover has a latching hole for receiving the rear support member and a pair of integral latching posts for latchingly engaging the side tabs.

5. The mounting arrangement of claims 2, wherein the circuit board is snap-mounted on the chassis.

6. The mounting arrangement of claim 5, wherein the chassis has two pairs of integral resilient arms, and wherein the board has apertures through which a first of said pairs of arms extend to engage the board with snap action, and peripheral edges against which a second of said pairs of arms engage with snap action.

7. The mounting arrangement of claim 5, wherein the chassis has rear supports having ledges on which a rear surface of the board rests, and central side wings on which central side surfaces of the board rest.

8. The mounting arrangement of claim 7, wherein the cover has integral posts extending downwardly of the cover and pressing the board against the wings in the assembled condition.

9. The mounting arrangement of claim 2; and further comprising a manually actuatable trigger mounted on the housing for movement relative thereto, said trigger extending at least partly along the handle.

10. The mounting arrangement of claim 9, wherein the trigger has a pair of curved fingerholds separated by a raised ridge.

11. The mounting arrangement of claim 9, wherein the trigger has a lower pivot portion, and further comprising a trigger plate snap-mounted on the handle and having means for pivotably mounting said lower pivot portion of the trigger.

12. The mounting arrangement of claim 11, wherein the trigger plate has an integral spring arm for urging the trigger away from the housing.

13. The mounting arrangement of claim 2; and further comprising an optical casing having one compartment for receiving the light emitter and means for optically modifying the light beam, and another compartment for receiving the light sensor and means for optically modifying the light from the indicia.

14. The mounting arrangement of claim 13, wherein the casing has co-linear extensions turnable about a turning axis, and wherein the casing has an offset arm extending transversely of the turning axis, and adjusting means accessible from above the chassis for adjusting the position of the arm and, in turn, the position of the light beam.

15. The mounting arrangement of claim 14, wherein the adjusting means includes a spring located between the chassis and the offset arm.

16. The mounting arrangement of claim 15, wherein the casing has integral metal wall portions surrounding the light emitter and serving as a heat dissipator therefor, and additional integral metal wall portions surrounding the light detector and serving as an electro-magnetic interference shield therefor.

17. The mounting arrangement of claim 15, wherein the extensions have shaft portions, and wherein the chassis has integral catches for receiving the shaft portions with a snap action.

18. The mounting arrangement of claim 17, wherein the cover has integral holders that overlie the shaft portions of the extensions in the assembled condition.

19. The mounting arrangement of claim 15, wherein the light sensor includes a detector mounted directly on the chassis, and the modifying means is an optical filter mounted in channel-shaped retainers integral with the chassis.

20. The mounting arrangement of claim 2, wherein the reflector includes an oscillatable scan mirror facing the light emitter for reflecting the light beam impinging thereon, and a collecting mirror facing the light sensor for reflecting the light from the indicia impinging thereon; and wherein the scanner includes means for jointly oscillating the mirrors a plurality of times per second.

21. The mounting arrangement of claim 20, wherein the scanner includes a bracket on which the reflector is supported, and wherein the oscillating means includes a permanent magnet mounted on the bracket, and an energizable electromagnetic coil operative, when energized, to attract the permanent magnet and, in turn, to move the bracket with the reflector thereon.

22. The mounting arrangement of claim 21, wherein the scanner includes a frame which extends through the holes and is mounted on the chassis.

23. The mounting arrangement of claim 22, wherein the coil has legs to facilitate mounting on the board.

24. The mounting arrangement of claim 2, wherein the handle is integral with the shell and bounds an interior handle space in which a printed circuit handle board is received, said handle space having opposite open ends, and further comprising guides for slidably receiving and holding the handle board.

25. The mounting arrangement of claim 24, wherein one of the open ends is closeable by an end cap to which an electrical cable is connected; and further comprising strain relief means on the cap to provide strain relief for the cable.

26. The mounting arrangement of claim 25, wherein the shell has a front exterior support portion, and wherein the end cap has a rear exterior support portion, and wherein the housing is self-supporting on a generally horizontal support surface by resting on said support portions.

27. The mounting arrangement of claim 2, wherein the cover has a light-absorbing inner liner and a shock-absorbing exterior canopy.

28. The mounting arrangement of claim 27, and further comprising a visual status indicator on the circuit board for generating a video signal, and a light conductor for conducting the video signal from the indicator through the cover for viewing the video signal exteriorly of the housing.

29. The mounting arrangement of claim 2, and further comprising a sound status annunciator on the circuit board for generating an acoustic signal, and an acoustic resonator for amplifying the acoustic signal.

30. The mounting arrangement of claim 1, and further comprising a window mounted in the housing, and means associated with the window for heating the window.

31. An in-housing optical adjustment arrangement for use in a system for electro-optically reading indicia, comprising:

a) a chassis having a body portion generally lying in a first plane;

b) a printed circuit board supported by the chassis and generally lying in a second plane elevated above the first plane, said circuit board having holes extending therethrough;

c) an optical assembly including a light emitter component for emitting a light beam, a light sensor component for detecting light from the indicia over a field of view, and a scanner including a light reflector component for scanning at least one of said light beam and said field of view;

d) means extending through the holes for supportably mounting the emitter component, the sensor component and the reflector component on the chassis at accessible locations elevated above the first plane and the second plane with accessibility from above and below the board; and e) means for automatically adjusting at least one of the components.

* * * * *